Oct. 13, 1970

H. LINK 3,533,306

PROGRAMMING APPARATUS FOR MACHINE TOOLS OR THE LIKE

Filed May 13, 1968

Inventor:
Helmut Link
By Michael S. Striker
Attorney

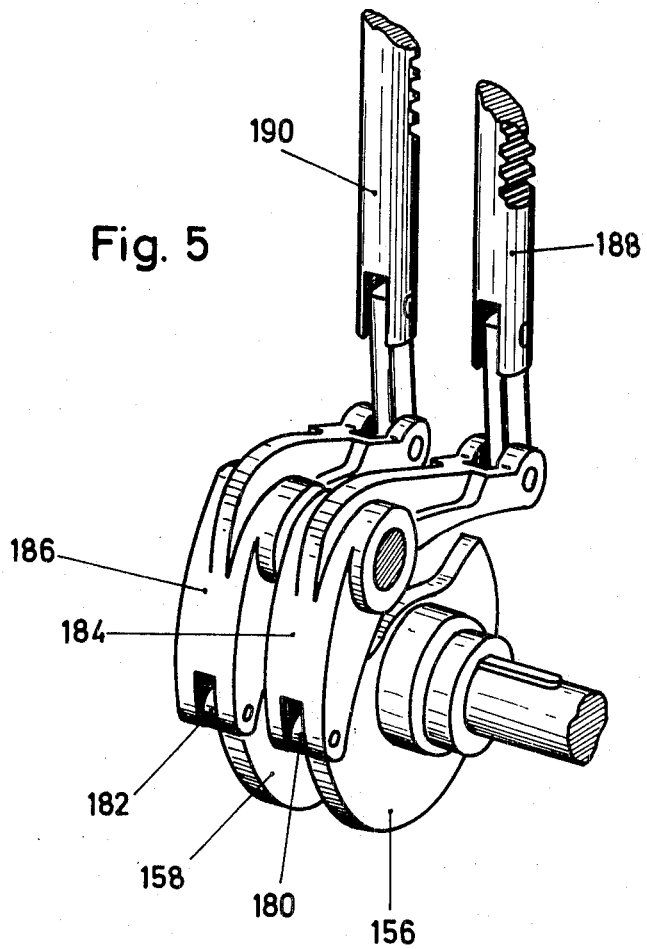

United States Patent Office 3,533,306
Patented Oct. 13, 1970

3,533,306
PROGRAMMING APPARATUS FOR MACHINE
TOOLS OR THE LIKE
Helmut Link, Esslingen-Lerchenacker, Germany, assignor to Index-Werke KG Hahn & Tessky, Esslingen, Germany
Filed May 13, 1968, Ser. No. 728,619
Claims priority, application Germany, May 19, 1967, J 33,696
Int. Cl. F16h 25/10, 37/06; B23b 7/04
U.S. Cl. 74—675
17 Claims

ABSTRACT OF THE DISCLOSURE

A programming apparatus wherein a follower tracks the faces of a cam which is rotated by a first drive at a lower first speed but can be rotated at a higher second speed by a second drive which is started when the follower tracks predetermined portions of faces on the cam. Parts of the two drives together form a planetary transmission wherein the planet carrier is rigid with the cam and the ring gear which meshes with the planet pinions of the carrier receives torque from a shaft which is driven at a constant speed. The sun gear which is stationary when the cam is to rotate at the first speed is set in motion at predetermined intervals to rotate in the direction of rotation of the planet carrier and to thereby drive the cam at the second speed.

BACKGROUND OF THE INVENTION

The present invention relates to apparatus for effecting recurring movements of parts or groups of parts in machine tools or the like. More particularly, the invention relates to a programming apparatus which can transmit periodically recurring movements to carriages, turrets, shafts, tool holders, transfer mechanisms, work holders and/or other movable parts of machine tools. Still more particularly, the invention relates to improvements in programming apparatus of the type wherein a follower tracks the face of a mobile cam to transmit motion to parts of machine tools or the like.

Programming apparatus are used in automatic machine tools, for example, in automatic turret lathes wherein a reciprocable carriage supports an indexible turret for tool holders. Rapid advance and feed movements of tools in the tool holders are normally initiated by a follower which tracks a rotary cam having a series of peripheral cam faces each of which regulates to movements of one tool. Each face of the cam normally comprises a leading portion which slopes outwardly away from the axis of the cam and a trailing portion which is substantially concentric with the cam. The trailing portion of each preceding cam face is separated from the leading portion of the next-following cam face by a substantially radially extending facet or flank along which the follower travels when the carriage for the tool turret is retracted to starting position prior to the beginning of the next stage of a complete working cycle.

When the follower approaches the tip between the trailing portion of a cam face and the adjoining flank, the cam must continue to turn through a certain angle in order to move the tip sufficiently beyond the axis of the follower so that the latter can move radially inwardly toward the cam axis. If the follower is a roller, the cam must cover an angular distance which at least equals the radius of the roller so that the latter's peripheral surface can engage the radial flank. Such angular movements of the cam consume much time at the expense of the output.

It has already been proposed to reduce the intervals which are required to move the follower of a motion transmitting mechanism from the trailing portion of a radially outwardly sloping cam face on a rotary cam into engagement with the leading portion of the next-following cam face. The patent proposes to impart to the follower a movement independently of the cam so that it can be rapidly transferred from engagement with the trailing portion of a preceding cam face into engagement with the leading portion of the next-following cam face. A drawback of this proposal is that the motion transmitting mechanism between the cam and the mobile part or parts of the machine tool is quite complicated, bulky, prone to malfunction, and requires a large number of precision-finished parts.

Another proposal discloses a programming apparatus wherein the cam is rapidly rotated, first in forward direction and thereupon rearwardly, when the follower approaches the tip between the trailing end of a cam face and the next-following radial flank. The apparatus reduces the length of intervals between successive stages of a complete working cycle; however, the drives which effect normal, rapid forward, and rapid rearward movements of the cam are very bulky, expensive, complicated and prone to malfunction.

SUMMARY OF THE INVENTION

It is an object of my invention to provide a simple, compact, rugged, adjustable, inexpensive and lightweight but reliable and highly versatile programming apparatus which can be utilized in machine tools or the like to transmit periodically recurring movements to one or more mobile parts in a predetermined sequence and in such a way that the intervals between successive stages of a multi-stage operating cycle can be reduced to a minimum without necessitating any movements of the follower or followers independently of the cam or cams and without necessitating movements of the cam or cams at more than two speeds.

Another object of the invention is to provide novel and improved drive means for the cam or cams in a programming apparatus of the just outlined character.

A further object of the invention is to provide a programming apparatus which may but need not receive motion from the customary control shaft of an automatic machine tool and wherein the intervals elapsing between successive stages of a multi-stage operating cycle are reduced without necessitating rotation of the cam or cams in different directions.

An additional object of the invention is to provide a programming apparatus which can be built into or combined with known machine tools or other types of machines wherein the movements of one or more parts must be regulated in accordance with a predetermined pattern.

An ancillary object of the invention is to provide a programming apparatus which can be readily and rapidly converted for controlling the movements of widely different parts, in any desired sequence, to any desired extent, and with a high degree of accuracy.

The improved programming apparatus serves to transmit recurring movements to parts of machine tools or the like and comprises at least one rotary cam provided with a cam face tracked by the follower of a motion transmitting unit which can include a lever one arm of which carries the follower and another arm of which is operatively connected to a carriage or other mobile part of a machine tool, first drive means for rotating the cam at a predetermined first speed, and second drive means for rotating the cam at a predetermined second speed which is different from the first speed.

The first drive means preferably comprises a planet carrier which is rigid with the cam, at least one planet pinion on the carrier, and a driven ring gear meshing with the planet pinion to thereby rotate the cam at the first speed. The second drive means preferably includes a sun gear which meshes with the planet pinion and is stationary when the cam should be driven at the first speed. The sun gear is rotated in the direction of rotation of the planet carrier when the cam is to rotate at the higher second speed. This sun gear can be driven intermittently by a Geneva transmission, by an electric motor or by any other suitable means which can rotate the shaft of the sun gear through angles of predetermined magnitude, for example, when the follower approaches the tip between the trailing portion of a cam face and a radial flank of the cam which extends between such trailing portion and the leading portion of the next-following cam face.

The novel features which are considered as characteristic of the invention are set forth in particular in the appended claims. The improved programming apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 5 is a perspective view showing a detail of the second machine tool.

DESCRIPTION OF THE PREFERRED EMBODIMENTS

Figure 1:
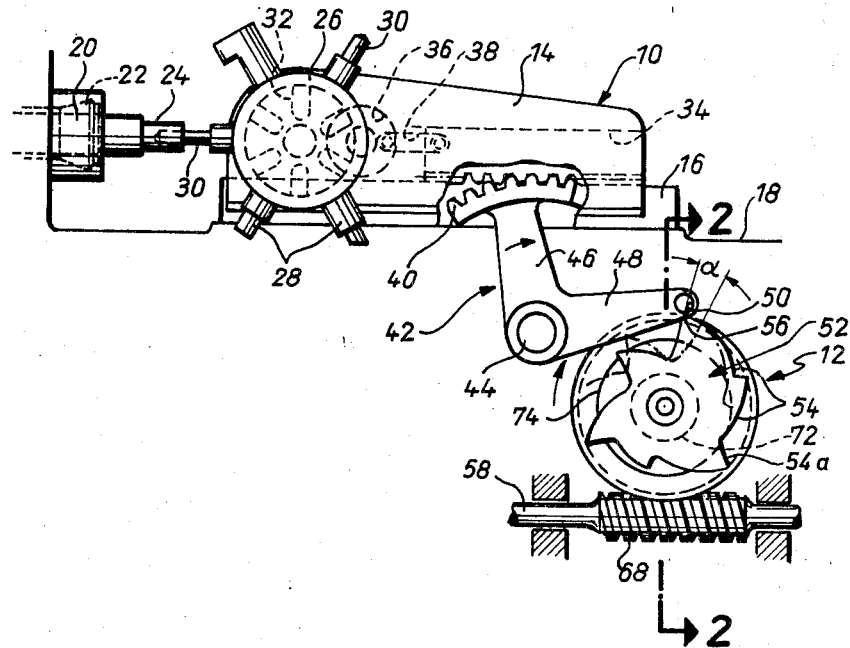
FIG. 1 is a fragmentary schematic elevational view of a turret lathe including a programming apparatus which embodies one form of my invention.

Referring first to FIG. 1, there is shown a portion of an automatic machine tool 10 which embodies a programming apparatus 12 for transmitting periodically recurring movements to a reciprocable carriage or slide 14. The latter is movable back and forth along ways 16 provided on the frame 18 of the machine tool. The frame 18 further supports a rotary work spindle 20 which is provided with a chuck 22 serving to releasably hold a workpiece 24. This workpiece constitutes the foremost end of a bar which can be fed through the work spindle 20 in a manner well known from the art.

In the embodiment of FIG. 1, the machine tool 10 is a turret lathe which further comprises an indexible tool turret 26 mounted on the carriage 14 and supporting several radially extending equidistant tool holders 28. The tool holders 28 carry tools 30 one of which is shown in engagement with the workpiece 24 in the chuck 22. For example, the tool 30 which engages the workpiece 24 may be used to drill an axially extending bore. The turret 26 supports six tool holders 28 but one of these tool holders has been omitted in order to reveal certain parts of an indexing mechanism for the turret. This indexing mechanism is mounted in the interior of the carriage 14 and comprises a six-slot Geneva wheel 32 which is affixed to the shaft of the turret 26. The wheel 32 can be indexed by a driver pin provided on a rotary disk 36. When the disk 36 completes a full revolution, its driver pin causes the Geneva wheel 32 to turn by 60 degrees so as to place the next-following tool holder 28 into registry with the workpiece 24 in the chuck 22 of the work spindle 20.

The means for transmitting motion from a disk-shaped cam 52 of the programming apparatus 12 to the carriage 14 comprises a rack 34 which is slidable in the carriage 14 and whose underside is provided with a row of teeth meshing with the teeth of a segment gear 40 rigid with one arm 46 of a bell crank lever 42 which is fulcrumed on a pin 44 carried by the frame 18 and whose other arm 48 carries a roller follower 50 arranged to track the faces 54 of the cam 52 in a manner to be described later. The rack 34 is articulately coupled with the disk 36 by a connecting rod 38.

When the treatment of the workpiece 24 by one of the tools 30 is completed, the turret 26 must be indexed by 60 degrees to move the next tool 30 into requisite position for engagement with the workpiece. This is achieved in the following way: A suitable crank drive (not shown) causes the disk 36 to perform a complete revolution. The lever 42 is then at a standstill and holds the rack 34 against displacement in the longitudinal direction of the ways 16. Since the disk 36 is coupled to the rack 34 by the connecting rod 38, it causes the carriage 14 to move away from the work spindle 20 during a first stage of its revolution and thereupon causes its driver pin to index the Geneva wheel 32 and turret 26 by 60 degrees after the leftmost tool 30 of FIG. 1 clears the workpiece 24. In other words, relative movability of the carriage 14 and rack 34, combined with the action of the connecting rod 38, insures that the tool 30 which has treated the workpiece 24 during the preceding stage of a complete working cycle is fully withdrawn from the workpiece before the wheel 32 causes the turret 26 to change its angular position.

The cam 52 of the programming apparatus 12 turns in a clockwise direction, as viewed in FIG. 1, and is provided with six cam faces 54, one for each of the tool holders 28 on the turret 26. The trailing portion of each preceding cam face 54 is separated from the leading portion of the next-following cam face 54 by a substantially radially extending flank or facet 54a. FIG. 1 also shows that each cam face 54 slopes generally outwardly, i.e., away from the axis of the cam 52, as considered in the direction of rotation.

In FIG. 1, the follower 50 tracks the trailing portion of the adjoining cam face 54 and is about to reach the tip 56 between this cam face and the adjoining flank 54a. In order to permit return movement of the carriage 14 to retracted position, the follower 50 must move substantially radially inwardly, i.e., toward the axis of the cam 52, so that the lever 42 can turn in a clockwise direction and causes its segment 40 to move the rack 34 and the carriage 14 in a direction to the right. However the follower 50 permits such clockwise rotation of the lever 42 only when it moves sufficiently beyond the tip 56 so that its peripheral surface can travel along the substantially radially extending flank 54a. While the follower tracks the leading (inner) portion of a cam face 54, the cam 52 is driven at a constant first speed by a first drive which includes a shaft 58. This first speed is rather low, i.e., it would take considerable time to move the follower 50 sufficiently beyond the tip 56 so that the follower could move toward the axis of the cam 52 and would thus permit the carriage 14 to move to the right in order to return to the starting position which is required at the start of the next stage. The purpose of the programming apparatus 12 is to reduce such time to a minimum and to thus increase the output of the turret lathe 10.

The first time drive of the apparatus 12 includes the aforementioned shaft 58 and serves to rotate the cam 52 at a relatively low first speed during those periods when the corresponding tools 30 are caused to move toward, to penetrate into, and to remove material from the workpiece 24. This first drive further includes a ring gear 60 which is driven at a constant speed and is rotatable in a bearing 62 provided therefor in the frame 18. The ring gear 60 has an annulus of internal teeth 64 and an annulus of external teeth 66. The external teeth 66 form a worm wheel which meshes with a worm 68 on the shaft 58; the latter is driven at a constant speed by the motor of the turret lathe 10 or by a separate motor. The first drive further includes a planet carrier 72 which is rotatable in bearings 70 of the frame 18 and is coaxial with the ring gear 60. The head 74 of the carrier 72 supports two shafts 84 for planet pinions 76, 78 which are located diametrically opposite each other and mesh with the annulus of internal teeth 64. The cam 52 is mounted on a stub 86 of the planet carrier 72 and is rigidly secured thereto by a bolt 88 so that the cam and the carrier form an assembly of parts which rotate as a unit.

The second drive of the apparatus 12 which can rotate the cam 52 at a higher second speed when the follower 50 tracks the trailing portion of a cam face 54 comprises a sun gear 80 which is coaxial with the planet carrier 72 and meshes with the planet pinions 76, 78, a shaft 82 which is rigid with the sun gear 80 and is rotatable in the ring gear 60, and a rotating means for the shaft 82. This rotating means includes an intermittently operated Geneva transmission whose wheel 92 is rigid with the outer end portion 90 of the shaft 82 and can be indexed by a driver pin provided on a crank arm 94 affixed to a driver shaft 96.

The ring gear 60 has a disk-shaped flange 98 provided with a circumferential T-groove 100 which can accommodate actuating members or trips (not shown) and permits adjustment of such trips in the circumferential direction of the ring gear. The trips actuate one or more, suitably positioned switches (not shown) which can start and arrest the prime mover for the driver shaft 96.

The operation is as follows:

During a working cycle, the shaft 58 of the first drive for the cam 52 is rotated at a constant speed and rotates the ring gear 60 of the first drive at a greatly reduced speed by way of the transmission including the worm 68 and worm wheel 66. The follower 50 tracks one of the cam faces 54 on the cam 52 from its leading portion toward and along the trailing portion whereby the lever 42 causes the rack 34 to effect rapid advance and feed movements of the corresponding tool 30. The shaft 82 of the second drive for the cam 52 is idle so that the planet pinions 76, 78 roll along the sun gear 80 which is held at a standstill. Such rolling of planet pinions 76, 78 causes the planet carrier 72 to rotate at a speed which is considerably lower than the speed of the ring gear 60; however, the gear 60 and carrier 72 rotate in the same direction, namely, clockwise is viewed in FIG. 1. When the carriage 14 reaches the end of its forward stroke, i.e., when the follower 50 reaches the tip 56 between the adjacent cam face 54 and the next-following flank 54a, the Geneva transmission 92–96 is started while the ring gear 60 continues to rotate at a constant speed which is determined by the speed of the shaft 58 for the worm 68. The Geneva wheel 92 turns the shaft 82 and sun gear 80. The signal which starts the Geneva transmission 92–96 is produced by one of the trips in the T-groove 100 of the flange 98 which rotates with the ring gear 60 and actuates a switch which is adjacent to the flange 98. The Geneva wheel 92 suddenly turns the sun gear 80 through an angle of predetermined magnitude in the direction of rotation of the ring gear 60. The sun gear 80 brings about rapid angular displacement of the planet carrier 72 by way of planet pinions 76, 78 while the speed of the ring gear 60 remains constant. As indicated in FIG. 1, the second drive for the cam 52 can cause a sudden angular displacement of this cam by an angle alpha which is large enough to move the axis of the follower 50 sufficiently beyond the tip 56 so that the follower can move radially inwardly and comes to rest when it engages the leading portion of the next-following cam face 54. Such rapid clockwise rotation of the lever 42 is effected by a spring which is preferably installed in or adjacent to the ways 16 and operates between the carriage 14 and frame 18 to rapidly return the carriage in a direction to the right and back to a starting position which is determined by the extent to which the follower 50 can move radially toward the axis of the cam 52 after it clears a tip 56. It will be seen that the programming apparatus 12 reduces the time between successive stages of a complete working cycle to a minimum, i.e., the length of an interval between two successive feed strokes of the carriage 14 (in a direction to the left, as viewed in FIG. 1) depends solely on the strength of the spring which biases the carriage 14 in a direction to the right and on the friction between the carriage 14 and ways 16 on the one hand and the lever 42 and its pin 44 on the other hand.

If desired, the rotating means for the shaft 82 of the second drive for the cam 52 can be coupled with the aforementioned drive for the disk 36; in such machine tools, the aforementioned limit switches and trips can be dispensed with, i.e., the drive for the disk 36 can be programmed in such a way that it automatically rotates the shaft 82 when the carriage 14 completes a feed stroke and should be rapidly returned to starting position for the next stage of a working cycle.

Figure 2:
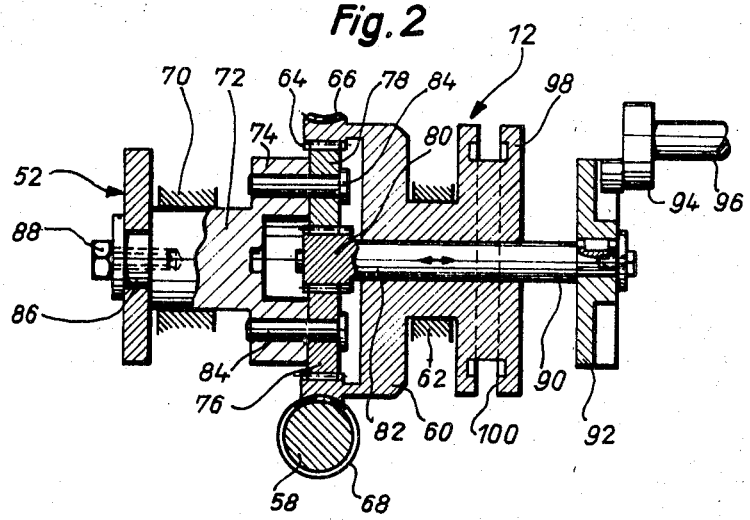
FIG. 2 is a larger-scale sectional view of the programming apparatus as seen in the direction of arrows from the line 2—2 of FIG. 1.

If the time required for a stage of a working cycle is rather short, the feature that the cam 52 can be rotated at two different speeds might not contribute to considable savings in output. Therefore, the operator will then wish to disconnect the second drive and to rotate the cam 52 solely by the power train which includes the shaft 58, worm 68, ring gear 60, planet pinions 76, 78 and planet carrier 72. This can be achieved in a very simple and time-saving manner by mounting the shaft 82 for axial movement with reference to the planet carrier 72 as indicated in FIG. 2 by a double-headed arrow. In other words, the sun gear 80 can be moved into or out of mesh with the planet pinions 76, 78. Such mode of inactivating the second drive for the cam 52 is particularly practical when the shaft 82 receives motion from the aforementioned drive for the disk 36. The means for moving the shaft 82 axially may comprise a knob or any other suitable displacing device which is not shown in the drawing. FIG. 2 shows the head 74 of the carrier 72 is provided with a centrally located recess which can accommodate the sun gear 80 when the latter is shifted to the left so that it moves out of mesh with the planet pinions 76, 78.

It is further clear that the Geneva transmission 92–96 for the shaft 82 can be replaced by other rotating means which can turn the sun gear 80 through angles of desired magnitude and at a desired speed.

Figure 3:
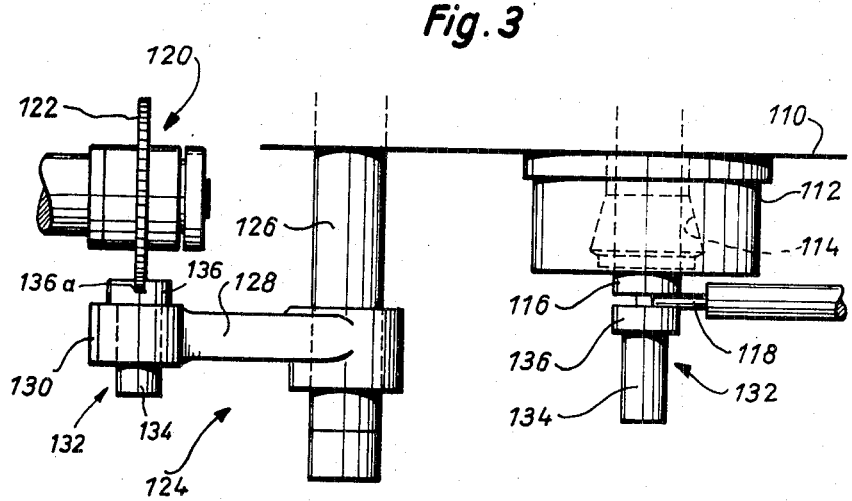
FIG. 3 is a fragmentary top plan view of a second machine tool which includes a transfer mechanism receiving motion from a modified programming apparatus.
Figure 4:
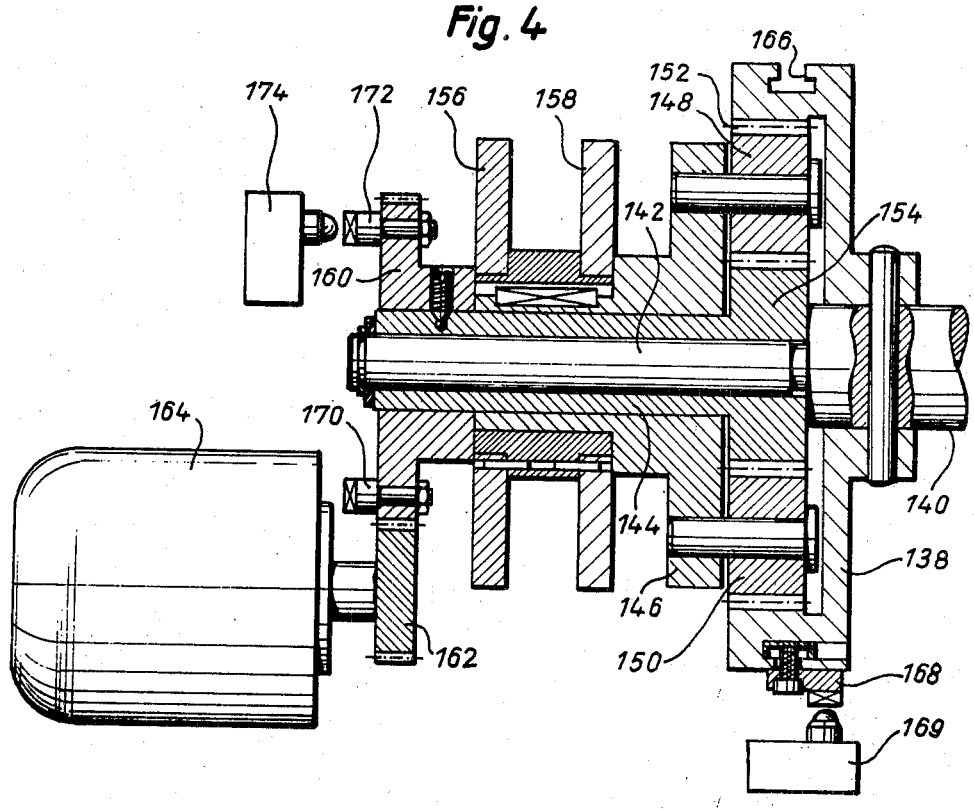
FIG. 4 is an axial sectional view of the programming apparatus for the transfer mechanism of the machine tool shown in FIG. 3.

FIGS. 3 and 4 illustrate a portion of a second machine tool which embodies a modified programming apparatus. As shown in FIG. 3, the machine tool comprises a frame 110 for a work spindle 112 which is provided with a chuck 114 for partially finished workpieces 132. The workpieces 132 are severed from a bar 116 by a tool 118. Each partially finished workpiece 132 has a cylindrical flange or collar 136 at one end of a cylindrical stem 134. The machine tool is further provided with a tool 122, e.g., a disk-shaped saw, which is used to provide the end face of each flange 136 with a diametral slot 136a as shown in the left-hand portion of FIG. 3. The tool 122 and its drive 120 are installed at the treating station of the machine tool, i.e., in the space which also accommodates the tool 118 as well as one or more additional tools (not shown) which remove material from the bar 116 in order to form the stems 134. A transfer mechanism 124 including a rockable and axially reciprocable shaft 126 is provided to grasp a partially finished workpiece 134 before the latter is fully separated from the bar 116 and to move the workpiece into the range of the tool 122 so that the latter can form the slot 136a. The tool 118 can be mounted in the holder of a turret similar to the turret 26 of FIG. 1, and such turret can be moved back and forth and indexed in the same way as described in connection with FIGS. 1 and 2.

The shaft 126 of the transfer mechanism 124 is mounted in the frame 110 and carries a radially extending arm 128 provided with a ring-shaped or otherwise configurated gripper or clamp 130 adapted to engage and to hold the stems 134 of successive workpieces 132. The purpose of the programming apparatus shown in FIG. 4 is to initiate and control movements of the shaft 126 in such a way that the gripper 130 can properly engage a workpiece 132 before the latter is completely severed from the bar 116 and that the gripper thereupon moves the workpiece 132 toward and feeds its flange 136 against the teeth of the tool 122 in order to form therein a slot 136a. This entails a series of properly timed movements of the shaft 126, namely, an axial movement downwardly, as viewed in FIG. 3, so that the gripper 130 (without a workpiece 132 therein) moves to a level below and into registry with the stem 134 of the workpiece 132 which is still connected to the bar 116, that the gripper 130 then moves upwardly and surrounds and engages the stem 134, that the gripper thereupon turns about the axis of the shaft 126, and that the gripper is then fed upwardly so as to move the flange 136 into the range of teeth on the tool 122. In other words, the shaft 126 must perform controlled (successive and/or overlapping) axial and angular movements, always through distances and angles of predetermined magnitude. The programming apparatus of FIG. 4 comprises two cams 156, 158 one of which brings about and controls axial movements and the other of which brings about and controls angular movements of the shaft 126, arm 128 and gripper 130 of the transfer mechanism 124. The cams 156, 158 cooperate with two motion transmitting levers 188, 190 whose operation is analogous to that of the lever 42 and, such levers and their respective followers 180, 182, 184, 186 for the faces of the cams 156, 158 are shown in FIG. 5.

In conventional machine tools, movements of the shaft 126 for the gripper 130 are regulated by the customary control shaft of the machine tool. In other words, cams corresponding to the cams 156, 158 are normally mounted on the control shaft of the machine tool and cause the shaft 126 to perform axial and angular movements in synchronism with movements of other parts in the machine tool. As a rule, the control shaft is rotated at a relatively low speed; therefore, axial and angular movements of the shaft 126 in a conventional machine consume much time, especially if a particular treatment of workpieces requires a relatively long interval of time because the rotational speed of the control shaft is then very low. Since the transfer mechanism is mounted at the treating station, movements of the gripper in the axial direction or about the axis of its shaft normally necessitate an interruption of all other operations. This results in a considerable reduction in the output of the machine tool.

The programming apparatus of FIG. 4 is designed to reduce the length of intervals necessary for transfer of workpieces 132 from the work spindle 112 to the tool 122 in that the shaft 126 receives motion from cams 156, 158 which are not directly mounted on the control shaft 140 of the machine tool. The interval required for transfer of a workpiece 132 from the tool 118 to the tool 122 is reduced to a minimum, i.e., to the shortest interval which is possible without affecting proper engagement between the gripper 130 and workpieces 132 and without undue stressing of movable parts.

A first drive of the programming apparatus shown in FIG. 4 comprises a ring gear 138 which is rigidly secured to the control shaft 140 of the machine tool including the tools 118, 122 and the transfer mechanism 124. The control shaft 140 has a smaller-diameter extension or stub 142 which extends beyond the ring gear 138 and supports a tubular shaft 144 of the second drive for the cams 156, 158. The shaft 144 is freely rotatable on the extension 142 and supports a planet carrier 146 which is free to rotate with respect thereto. The carrier 146 supports two planet pinions 148, 150 which are located diametrically opposite each other and mesh with the annulus of internal teeth 152 in the ring gear 138 and also with the teeth of a sun gear 154 on the tubular shaft 144. The cams 156, 158 are rigidly connected to the carrier 146 and are axially spaced from each other. The cam 156 effects axial and the cam 158 effects angular displacements of the shaft 126 in the transfer mechanism 124.

The left-hand end of the tubular shaft 144 extends beyond the planet carrier 146 and is rigid or integral with a gear 160 which forms part of hte second drive and can be rotated to drive the sun gear 154 when necessary. The gear 160 meshes with a gear 162 which is mounted on the output shaft of an electric motor 164. This motor 164 is a braking motor. The parts 144, 160, 162, 164 constitute a rotating means for the sun gear 154.

The external surface of the ring gear 138 is provided with an annular T-groove 166 which accommodates two actuating members or trips 168 (only one shown). Each of these trips is adjustable in the circumferential direction of the ring gear 138 and can actuate one of two stationary control switches 169 (not shown). The gear 160 on the tubular shaft 144 also carries two actuating members or trips 170, 172 the former of which is installed in and can be adjusted lengthwise of an arcuate slot or groove provided in the gear 160. The trip 172 is fixedly secured to the gear 160. The trips 170, 172 can actuate a control switch 174 which is fixedly mounted in the frame 110 of the machine tool.

One of the trips 168 on the ring gear 138 is positioned in such a way that it actuates the control switch 169 shortly before the tool 118 of FIG. 3 completes the separation of a fresh workpiece 132 from the bar 116. Up to this moment, the cams 156, 158 are rotated at a relatively low speed by the control shaft 140 and by way of the ring gear 138, planet pinions 148, 150 and planet carrier 146. The motor 164 is idle, i.e., the sun gear 154 is at a standstill. The control switch 169 then starts the motor 164 and causes the sun gear 154 to rotate in the same direction as the ring gear 138, namely, by way of the gears 162, 160 and tubular shaft 144. Consequently, the planet carrier 146 begins to rotate at a much higher speed and rotates the cams 156, 158 at the same higher speed even though the rotational speed of the control shaft 140 remains unchanged. In other words, a higher speed is superimposed upon the speed which is due to the r.p.m. of the control shaft 140 and the rapidly rotating cams 156, 158 effect rapid transfer of a fresh workpiece 132 from the chuck 114 of the work spindle 112 into requisite position for formation of the slot 136a. The gripper 130 moves axially downwardly and turns in a clockwise direction, as viewed in FIG. 3 to move into registry with the workpiece 132 which is still connected to the bar 116; the shaft 126 then moves upwardly and the gripper 130 receives the stem 134 of the workpiece which is then severed from the bar 116. In the next step, the gripper 130 swings in a counterclockwise direction and the shaft 126 then begins an upward (feed) movement to move the flange 136 of the freshly transferred workpiece 132 against the teeth of the tool 122. With the possible exception of the last mentioned (feed) movement, all other movements of the shaft 126 can be carried out at a very high speed so that the transfer of a workpiece from registry with the work spindle 112 into registry with the tool 122 takes up only a small fraction of the time which would be required were the cams 156, 158 rotated solely by the control shaft 140.

The trip 172 on the gear 160 can actuate the control switch 174 to arrest the motor 164 when the gripper 130 properly holds a workpiece 132 in registry with the work spindle 112. The sun gear 154 is then arrested while the tool 118 completes the separation of the workpiece (held by the gripper 130) from the bar 116. The second of the two trips 168 in the groove 166 is then positioned in such a way that it actuates the control switch 169 again and starts the motor 164 as soon as the separation of the freshly formed workpiece 132 (held by the gripper 130) is completed so that the sun gear 154 rotates again and causes rapid transfer of the workpiece 132 to the position shown in the left-hand portion of FIG. 3. Rotation of the sun gear 154 is terminated when the trip 170 engages the control switch 174 and arrests the motor 164. This occurs when the workpiece 132 registers with the tool 122. The cam 156 is then driven again solely by the control shaft 140 and causes the shaft 126 to feed the flange 136 against the tool 122 at an optimum speed.

It is clear that the improved programming apparatus can be used for many additional purposes. For example, it is not necessary to rotate a cam at a higher speed only when the follower approaches the tip between a cam face and a flank (e.g., a cam face 54 and the next-following flank 54a of the cam 52 shown in FIG. 1). The cam can be rotated at a higher speed while the follower tracks the leading, median or trailing portion of a cam face thereon. In other words, and referring to FIG. 1, the programming apparatus 12 can be used to accelerate the cam 52 when the follower 50 approaches one of the six tips 56 as well as or only when the follower 50 tracks the leading, median or trailing portion of a cam face 54.

A very important advantage of the improved programming apparatus is that the angle through which the cam 52 or the cams 156, 158 rotate at a higher second speed can be determined in advance and maintained with a high degree of precision. Thus, the Geneva transmission 92–96 of FIG. 2 or the motor 164 of FIG. 4 can drive the sun gear 80 or 154 through an angle of exactly determined magnitude to insure that rapid rotation of the cam or cams ceases as soon as the follower 50 or the followers tracking the cams 156, 158 reach the leading portions of the next-following cam faces. The programming apparatus occupies little room and its energy requirements are very low. Therefore, it can be readily installed in, and operated by the prime movers of, conventional machine tools to occupy space which happens to be available so that there is no need to rearrange or redesign the customary parts of such machines.

The exact design of the programming apparatus will depend on the space which is available in a machine tool and on certain other factors. Thus, if the machine tool comprises a customary control shaft (such as the shaft 140 of FIG. 4), the shaft 144 for the sun gear 154 may be mounted on the control shaft and may serve as a bearing for the planet carrier 146. On the other hand, when the shaft 82 for the sun gear 80 is rotated by a drive other than the control shaft, or when the control shaft is not coaxial or parallel therewith, the shaft for the sun gear can be journalled in the ring gear 60 of the first drive for the cam. The design which is shown in FIGS. 1 and 2 is very satisfactory when the input shaft 58 of the first drive for the cam 52 makes an angle of 90 degrees with the axis of the cam because the worm drive 66, 68 for the ring gear 60 occupies very little room. The arrangement of FIG. 4 is desirable when the input shaft 140 of the first drive for the cam or cams is coaxial with the cams.

An advantage of a second drive which includes a braking motor (such as the motor 164 of FIG. 4) is that this motor can rotate the cam or cams at a higher speed during any desired interval of time, i.e., also when the follower or followers track the leading or median portion of a cam face. The adjustability of trips 168, 170 renders it possible to change the program when necessary and with little loss in time.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

What we claim is:

1. Apparatus for controlling recurring movements of a part of a machine tool comprising at least one cam having successive cam face portions; motion transmitting means including a follower arranged to track said cam face portions for transmitting motion from said cam to said part; a rotatable planet gear carrier of a planet gear drive, said cam being arranged on said carrier for rotation therewith, said planet gear drive comprising further at least one planet gear rotatably carried on said carrier, a sun gear meshing with said planet gear, and a ring gear meshing with said planet gear; first drive means cooperating with said ring gear for continuously driving the same in a predetermined direction; and second drive means cooperating with said sun gear for driving the same in said predetermined direction through a predetermined angle at least during the time in which said follower reaches the end of one of said cam face portions.

2. Apparatus as defined in claim 1, wherein said ring gear is driven at a constant speed.

3. Apparatus as defined in claim 1, wherein said sun gear is coaxial with said ring gear.

4. Apparatus as defined in claim 1, wherein said planet gear drive comprises a plurality of planet gears.

5. Apparatus as defined in claim 1, wherein said second drive means for said sun gear comprises a shaft which is coaxial with said sun gear, said ring gear being freely rotatable on said shaft.

6. Apparatus as defined in claim 1, wherein said ring gear comprises an annulus of internal teeth meshing with said planet gear and an annulus of external teeth, said first drive means further comprising a worm meshing with said external teeth to drive said ring gear.

7. Apparatus as defined in claim 6, wherein said first drive means further comprises means for driving said worm at a constant speed.

8. Apparatus as defined in claim 1, further comprising control means for initiating the operation for stoppage of said second drive means for said sun gear.

9. Apparatus as defined in claim 8, wherein said control means comprises at least one switch operatively connected with said second drive means and at least one actuating member mounted on said ring gear and arranged to actuate said switch once during each revolution of said ring gear.

10. Apparatus as defined in claim 9, wherein said ring gear has an arcuate peripheral groove and said actuating member is adjustable lengthwise of said groove.

11. Apparatus as defined in claim 1, wherein said second drive means comprises a Geneva transmission.

12. Apparatus as defined in claim 11, wherein said Geneva transmission comprises a wheel coaxially secured to said sun gear.

13. Apparatus as defined in claim 1, wherein said first drive means comprises a shaft coaxial with and arranged to rotate said ring gear at a constant speed.

14. Apparatus as defined in claim 13, wherein said shaft extends axially through said ring gear.

15. Apparatus as defined in claim 13, wherein said second drive means comprises an electric motor and a gear train connecting said motor with said sun gear.

16. Apparatus as defined in claim 13, wherein said shaft comprises a portion which constitutes a bearing for a portion of said second drive means.

17. Apparatus as defined in claim 16, wherein said portion of said second drive means is a tubular shaft and wherein said carrier is rotatable on said tubular shaft.

References Cited

UNITED STATES PATENTS

| | | | |
|---|---|---|---|
| 1,263,125 | 4/1918 | Sawyer | 74—675 |
| 2,940,337 | 6/1960 | Kalb | 74—675 |
| 3,007,302 | 11/1961 | Vincent | 74—675 X |
| 3,024,520 | 3/1962 | Pulman | 29—44 |
| 3,088,335 | 5/1963 | Bullard | 74—675 |
| 3,161,083 | 12/1964 | Roe | 74—675 |
| 3,200,655 | 8/1965 | Tringali | 74—54 |
| 3,359,818 | 12/1967 | Deuerell et al. | 74—675 |
| 3,340,878 | 10/1968 | Lawrence | 74—675 X |

ARTHUR T. McKEON, Primary Examiner

U.S. Cl. X.R.

29—44; 74—54, 679